May 30, 1950        J. J. OWEN        2,509,878
PREPARATION OF ALDEHYDES
Filed Jan. 2, 1947
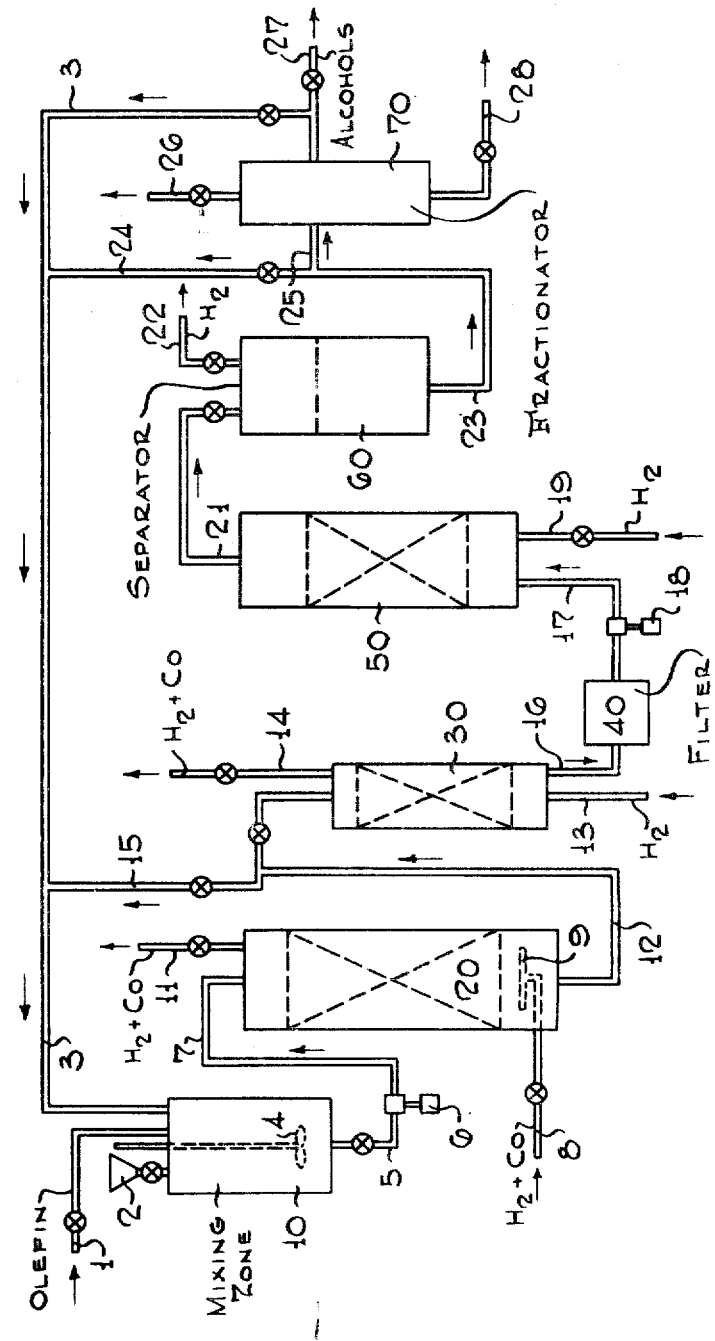
John J. Owen    Inventor
By _____ Attorney

UNITED STATES PATENT OFFICE 2,509,878

PREPARATION OF ALDEHYDES

John J. Owen, Baton Rouge, La., assignor to Standard Oil Development Company, a corporation of Delaware Application January 2, 1947, Serial No. 719,725

3 Claims. (Cl. 260—604)

The present invention is concerned with improved catalysts for the process for the preparation of oxygenated organic compounds by the reaction of olefins with hydrogen and carbon monoxide and the further hydrogenation to alcohols of the carbonyl compounds such as aldehyde and ketone products so formed. In particular, the invention is concerned with a method of preventing gel formation when a part or all of the synthesis catalyst is added with the olefin feed. In accordance with my invention, I prevent gel formation by the addition of alcohol or aldehyde to the feed, which is preferably secured by recycling a part of the aldehyde or alcohol product with the feed. A specific adaptation of my invention is to add a metallic soap to a mixture of olefin feed and alcohol or to dissolve the soap in the alcohol and then add this stream to the olefin feed.

It is well known in the art to synthesize alcohols from olefins or diolefins, carbon monoxide and hydrogen in the presence of a cobalt-containing catalyst, or an equivalent catalyst in a two-step process in which the product formed in the first step is predominately aldehydes or ketones with a minor portion of alcohols. The product from the first stage is subjected to hydrogenating conditions in which the aldehydes and ketones are converted to the corresponding alcohols. The cobalt-containing catalyst used in the first or synthesis stage for the production of carconyl products may be used in the second stage, or it may be substituted by one of several known hydrogenation catalysts, as for example, nickel-containing materials. The cobalt-containing catalyst may also contain thoria, copper, magnesia and the like as promoters.

This reaction may be simply represented for a mono-olefin feed as follows, although, it is understood that other reactions may take place to a minor extent (R represents a hydrocarbon radical):

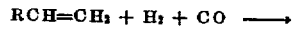

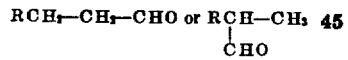

It is evident from the above reaction that a primary alcohol containing one more carbon atoms than the starting mono-olefin will result and that the position in the molecule of the added hypdroxyl group will depend on the position of the double bond in the original olefin or the position to which the double bond may shift by isomerization under the reaction conditions used. The purpose for which the product alcohol is to be used determines the type of olefin to be selected as a feed stock. Alcohols prepared by this process may be used for many purposes, such as solvents, antifoam agents, and after esterification or sulfation as plasticizers, detergents and wetting agents. For example, for the preparation of sodium lauryl sulfate for use as a detergent, the preferred olefin feed for the alcohol synthesis is undecene-1. Other olefins and diolefins such as ethylene, propylene, butylenes, pentenes, hexenes, butadiene, pentadienes, olefin polymers, such as diisobutylene, triisobutylene, polypropylene, and olefinic fractions from the hydrocarbon synthesis process, thermal or catalytic cracking operations, and other sources may be used as starting materials depending on the nature of the aldehydes and alcohols that it is desired to produce.

The synthesis gas may be manufactured from many materials, such as coke, coal, lignite or hydrocarbon gases, particularly natural gas or methane. The solid fuels may be converted by known methods into carbon monoxide and hydrogen by catalytic treatment with steam. The ratio of carbon monoxide to hydrogen may be varied by varying the amount of steam whereby a part of the carbon monoxide reacts with the steam to form carbon dioxide and hydrogen. The hydrocarbon gases may be converted to synthesis gas in a number of ways, such as, by treatment with oxygen, carbon dioxide, or a combination of water and carbon dioxide.

In the aldehyde synthesis step, the ratio of hydrogen to carbon monoxide employed may vary appreciably. Ratios of 0.5 volume of hydrogen to 2.0 volumes of hydrogen per volume of carbon monoxide may be employed. The preferred ratios comprise about 1.0 volume of hydrogen per volume of carbon monoxide. The quantities of olefins employed per volume of synthesis gas likewise vary considerably, as well as, the composition of the olefin feed stream. The olefin feed may comprise pure olefins or may comprise olefins containing hydrocarbons and the like. In general, it is preferred that the olefins comprise olefins having from 2 to 18 carbon atoms in the molecule. Particularly desirable olefins comprise hydrocarbons having from about 8 to 18 carbon atoms in the molecule. The aldehyde synthesis reaction is generally conducted employing a pressure in the range from about 100 to 300 atmospheres and a temperature in the range of about 200° F. to 400° F.

In the hydrogenation step any catalyst, as for example, nickel, tungsten, or sulfides of Groups VI and VIII metals of the Periodic Table may be utilized. The hydrogenation temperatures are generally in the range from about 150° F. to 750° F. depending on the catalyst employed, while the pressures are usually in the range of about 100 to 300 atmospheres. The quantity of synthesis gas with respect to olefins utilized may vary considerably, as for example from 1000 to 45,000 cu. ft. of carbon monoxide and hydrogen per barrel of olefin feed. In general, approximately 2,500 to 15,000 cu. ft. of synthesis gas per barrel of olefin feed is employed.

In the first stage of the alcohol synthesis process, particularly in a process utilizing a cobalt catalyst, one problem encountered is that the cobalt or equivalent catalyst reacts under the conditions of the synthesis process to form cobalt carbonyl. The cobalt carbonyl remains dissolved in the reaction products and is removed from the reaction zone, resulting in the depletion of the catalyst.

Various suggestions and proposals have been directed toward overcoming this problem. For example, it has been suggested that a finely divided slurry of cobalt catalyst be utilized in the first stage and be removed from the reaction zone and filtered after the reaction. This product is given a preliminary hydrogenation treatment to reduce any dissolved cobalt carbonyl to the metal before the final hydrogenation of the aldehyde to alcohol over a separate and different hydrogenation catalyst. This procedure is not entirely satisfactory because of the difficulties inherent in the pumping of slurries and in maintaining the catalyst in suspension. Another procedure suggested is that a cobalt salt of an organic acid be dissolved in the feed to the aldehyde synthesis zone. Organic salts are, for example, the naphthenates, stearates, oleates and the salts of equivalent fatty acids. This latter procedure is also not satisfactory, since when these salts are added a gel formation results. This gel formation is believed to be due to a high degree of association of the soap molecules into micelles of colloidal dimensions which form a structure capable of imbibing the hydrocarbons present, and which is capable of resisting finite shearing forces. I overcome this gel formation by the addition of aldehydes or alcohols to the feed, preferably by recycling aldehyde or alcohol products from the first or second stages of the reaction. The aldehyde or alcohol fractions to be recycled may be separated from diluents and reaction by-products by suitable fractionation.

The process of my invention may be readily understood by the drawing illustrating an embodiment of the same.

My invention is particularly directed toward the prevention and elimination of gel formation when synthesis catalysts, as for example, iron, nickel and cobalt are added to the feed streams. These catalysts are usually added to the feed stream in the form of metal soaps, such as cobalt stearate, nickel oleate, cobalt naphthenate and iron linoleate.

Referring specifically to the drawing, the feed mixture comprising olefins is introduced into mixing zone 10 by means of feed line 1. A suitable metal soap is also introduced into zone 10 by means of a hopper arrangement 2. Simultaneously, there is introduced into mixing zone 10 a recycle stream comprising an aldehyde or an alcohol, which products are secured as hereinafter described. This recycle stream is introduced into zone 10 by means of line 3. Suitable mixing means 4 are employed in zone 10 to secure adequate mixing of the respective streams. The mixture comprising olefins and a metal soap is withdrawn from zone 10 by means of line 5 and pumping means 6 and introduced into the top of an initial stage 20 by means of line 7. Initial stage 20 comprises the aldehyde synthesis zone and is preferably operated at a pressure of about 3000 lbs. per square inch and at a temperature of about 275° F. Feed gases comprising hydrogen and carbon monoxide are introduced into zone 20 by means of line 8 and distributing means 9. The gases flow upwardly through zone 20 and countercurrently contact the downflowing stream comprising olefins. Zone 20 may contain any suitable contacting means designed to secure better contact between the countercurrently flowing phases. Unreacted carbon monoxide and hydrogen are withdrawn from zone 20 by means of line 11 and handled in any manner desirable. Although countercurrent flow has been shown with respect to the operation of zone 20, it is to be understood that concurrent flow may be employed, and that the flow may be either upwardly or downwardly with respect to the various streams.

A product stream comprising aldehydes is withdrawn from zone 20 by means of line 12 and introduced into secondary zone 30 wherein carbonyls are decomposed. The carbonyls decomposed in zone 30 are generally the catalytic carbonyls. Thus, if the catalyst employed in zone 20 comprises cobalt, cobalt carbonyl will be formed, which carbonyl will subsequently be decomposed in zone 30. The carbonyls are decomposed in zone 30 by the addition of hydrogen which is introduced by means of line 13. Hydrogen and carbon monoxide are withdrawn from zone 30 by means of line 14 and handled in any manner desirable. Zone 30 is preferably operated at a pressure of about 200 lbs. per square inch and at a temperature in the range from about 250° F. to about 300° F.

In accordance with one embodiment of my invention I segregate at least a portion of the stream withdrawn from zone 20 and introduce this segregated portion into recycle line 3 by means of line 15.

The product stream is withdrawn from zone 30 by means of line 16 and passed through filtering zone 40. In zone 40 the metallic catalyst is separated from the product and handled in any manner desirable.

The product stream free of metal carbonyl, as for example, cobalt carbonyl, is withdrawn from zone 40 by means of line 17, pump 18 and introduced into hydrogenation zone 50. Hydrogen is introduced into hydrogenation zone 50 by means of line 19. In general, the catalyst may comprise any suitable hydrogenation catalyst, as for example nickel. When employing a nickel catalyst, the pressure maintained in zone 50 ranges from 300 to 3000 lbs. per square inch, while the temperature is about 350° F. The hydrogenated product stream is withdrawn from zone 50 by means of line 21 and introduced into separation zone 60. Unreacted hydrogen is withdrawn from zone 60 by means of line 22, while the hydrogenated product is withdrawn from separation zone 60 by means of line 23.

In accordance with one embodiment of my invention, I segregate a portion of the stream withdrawn from zone 60 by means of line 23 and introduce the segregated portion into recycle line 3 by means of line 24.

The remaining hydrogenated product stream is introduced into fractionation zone 70 by means of line 25. In zone 70 any suitable separation may be made of the product. Gases may be withdrawn from zone 70 by means of line 26, alcohol by means of line 27 and other products by means of line 28.

In accordance with the preferred adaptation of my invention I segregate a portion of the alcohols and recycle these segregated alcohols to mixing zone 10 by means of recycle line 3.

The process of my invention may be further understood by the following examples illustrating embodiments of the same.

Example 1

Di-isobutylene boiling in the range of 215–217° F. was refluxed with 1 per cent by weight of cobalt stearate until essentially all of the stearate was dissolved. When this solution was allowed to cool to room temperature, the entire quantity of material formed into a jelly-like solid.

Example 2

Di-isobutylene boiling in the range of 215–217° F., containing four weight per cent of nonyl alcohol formed by the alcohol synthesis process and from di-isobutylene feed as previously described, was refluxed with one weight per cent of cobalt stearate until essentially all of the stearate was dissolved. This solution was allowed to cool to room temperature as in Example 1. No gel formation was observed and the cooled solution remained as an easily pumpable liquid of low viscosity.

Example 3

Di-isobutylene boiling in the range of 215–217° F. was refluxed with one weight per cent of cobalt oleate until the oleate was essentially completely dissolved and the solution was cooled to room temperature. The entire mass formed a jelly-like solid. When this experiment was repeated in an identical manner, except that four weight per cent of nonyl alcohol was present, no gel resulted when the solution was cooled to room temperature.

Example 4

Di-isobutylene boiling in the range of 215–217° F. was heated with a mixture of 1% cobalt stearate and four weight per cent of nonyl aldehyde formed from di-isobutylene in the first stage of the synthesis previously described. The resulting solution did not form a gel when cooled to room temperature.

Example 5

Cobalt stearate was dissolved in nonyl alcohol prepared from di-isobutylene by the synthesis process previously described. This solution was then added to di-isobutylene to give a 1% solution of cobalt stearate. This solution did not form a gel at room temperature.

Example 6

Di-isobutylene containing 1% cobalt stearate and four weight per cent nonyl alcohols, prepared as in Example 2 above, was charged to an autoclave. Pressure was built up with a mixture of hydrogen and carbon monoxide and the experiment was conducted as outlined under (A) below. In another autoclave containing a feed prepared as in Example 4 above, a similar reaction was carried out as outlined under (B) below.

|  | (A) | (B) |
| --- | --- | --- |
| Catalyst | Cobalt Stearate | Cobalt Stearate. |
| Catalyst, Wt. Per Cent on Feed | 1.2 | 0.87. |
| Solubilizing Agent | C₉ alcohol from previous synthesis. | C₉ aldehyde from previous synthesis. |
| Wt. Per Cent of Solubilizing Agent (On Feed) | 4 | 3.3. |

|  | (A) | (B) |
| --- | --- | --- |
| Feed | Di-isobutylene | Di-isobutylene. |
| Reaction Temperature, °F. | 275 | 275. |
| Analysis of Di-isobutylene-free Product: | | |
| Hydroxyl Number | 35 | 4. |
| Carbonyl Number | 310 | 244. |
| Per Cent Olefin Conversion | 62 | 71. |

Example 7

In a continuous unit charged with a cobalt-copper-thoria-pumice catalyst, a feed consisting of di-isobutylene containing 1.2 weight per cent cobalt stearate and 4.8 weight per cent C₉ alcohol from a previous run was passed over the catalyst bed at one liquid v./v./hr., 323° F., and 3000 p. s. i. g. with a synthesis gas of 1.2 volume ratio of $H_2/CO$ at a gas rate of 13,500 cu. ft./bbl. of feed. A 54% conversion of di-isobutylene to oxygenated compounds, predominantly nonyl aldehyde, was obtained.

Example 8

In another continuous run using only silica gel as a packing material instead of the cobalt-copper-thoria-pumice catalyst of Example 7, a di-isobutylene feed containing 1 weight per cent cobalt stearate and four weight per cent C₉ alcohols from a previous synthesis, was treated at 3000 p. s. i. g., 300° F., 0.13 v./v./hr. with a synthesis gas of 1.2/1 $H_2/CO$ volume ratio at a rate of 8920 cu. ft./bbl. of feed. A conversion of 61% of the di-isobutylene feed into oxygenated materials predominantly nonyl aldehyde was obtained.

The process of my invention is not to be limited by any theory as to mode of operation, but only in and by the following claims.

I claim:

1. A continuous method for forming aldehydes which consists essentially in dissolving a relatively small amount of a cobalt soap in a liquified olefin, adding a relatively small amount of alcohol to said olefin to retard gelatin caused by the presence of the dissolved cobalt soap, continuously charging the resulting olefin solution to a reaction zone, simultaneously charging a mixture of hydrogen and carbon monoxide to said reaction zone, maintaining a temperature in said reaction of from about 200° to 400° F. while maintaining a pressure of from about 100 to 300 atmospheres, permitting the reactants to remain resident in the reaction zone for a sufficient period of time to effect the desired conversion, and withdrawing a crude aldehyde containing product.

2. The method of claim 1 in which the about 1 per cent of cobalt stearate based on the olefin is dissolved in said olefin.

3. The method of claim 1 in which the amount of alcohol added to the olefin is about 4 weight per cent based on the olefin.

JOHN J. OWEN.

REFERENCES CITED

The following references are of record in the file of this patent:

UNITED STATES PATENTS

| Number | Name | Date |
| --- | --- | --- |
| 2,327,066 | Roelen | Aug. 17, 1943 |
| 2,415,102 | Landgraf | Feb. 4, 1947 |
| 2,437,600 | Gresham et al. | May 9, 1948 |
| 2,449,470 | Gresham et al. | Sept. 14, 1948 |